(12) United States Patent
Bathiche et al.

(10) Patent No.: US 9,093,072 B2
(45) Date of Patent: Jul. 28, 2015

(54) SPEECH AND GESTURE RECOGNITION ENHANCEMENT

(75) Inventors: Steven Bathiche, Kirkland, WA (US); Anoop Gupta, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 238 days.

(21) Appl. No.: 13/554,513

(22) Filed: Jul. 20, 2012

(65) Prior Publication Data

US 2014/0022184 A1    Jan. 23, 2014

(51) Int. Cl.
*G06F 3/041* (2006.01)
*G10L 15/24* (2013.01)

(52) U.S. Cl.
CPC ........................................ *G10L 15/24* (2013.01)

(58) Field of Classification Search
None
See application file for complete search history.

(56) References Cited

U.S. PATENT DOCUMENTS

| | | | |
|---|---|---|---|
| 6,167,376 A | 12/2000 | Ditzik | |
| 7,467,089 B2 | 12/2008 | Roth et al. | |
| 7,506,271 B2 | 3/2009 | Wang et al. | |
| 7,706,611 B2 * | 4/2010 | King et al. | 382/181 |
| 7,881,936 B2 | 2/2011 | Longe et al. | |
| 7,941,316 B2 | 5/2011 | Mahajan et al. | |
| 8,019,602 B2 | 9/2011 | Yu et al. | |
| 8,077,975 B2 | 12/2011 | Ma et al. | |
| 2005/0288934 A1 | 12/2005 | Omi | |
| 2009/0146848 A1 * | 6/2009 | Ghassabian | 341/22 |
| 2010/0088096 A1 * | 4/2010 | Parsons | 704/235 |
| 2010/0241431 A1 | 9/2010 | Weng et al. | |
| 2011/0085211 A1 * | 4/2011 | King et al. | 358/474 |

OTHER PUBLICATIONS

Kurihara, K., M. Goto, J. Ogata, T. Igarashi, "Speech Pen: Predictive Handwriting based on Ambient Multimodal Recognition", Proceedings of the SIGCHI Conference on Human Factors in Computing Systems, CHI 2006, Apr. 22-27, 2006, pp. 851-860, Association for Computing Machinery (ACM), Montréal, Québec, Canada.

Song, H., H. Benko, F. Guimbretiere, S. Izadi, X. Cao, K. Hinckley, "Grips and Gestures on a Multi-Touch Pen", Proceedings of the 2011 Annual Conference on Human Factors in Computing Systems, CHI 2011, May 7-12, 2011, pp. 1323-1332, Association for Computing Machinery (ACM), Vancouver, BC, Canada.

Dusan, et al., "Multimodal Interaction on PDA's Integrating Speech and Pen Inputs", In 8th European Conference on Speech Communication and Technology, Sep. 1, 2003, pp. 2225-2228.

* cited by examiner

*Primary Examiner* — Adam R Giesy
(74) *Attorney, Agent, or Firm* — Sandy Swain; Judy Kadoura; Micky Minhas

(57) ABSTRACT

The recognition of user input to a computing device is enhanced. The user input is either speech, or handwriting data input by the user making screen-contacting gestures, or a combination of one or more prescribed words that are spoken by the user and one or more prescribed screen-contacting gestures that are made by the user, or a combination of one or more prescribed words that are spoken by the user and one or more prescribed non-screen-contacting gestures that are made by the user.

11 Claims, 6 Drawing Sheets

SPEECH AND GESTURE RECOGNITION ENHANCEMENT

BACKGROUND

The computing power and functionality of mobile computing devices continues to increase rapidly. Various types of mobile computing devices are now commercially available which allow users to affordably and conveniently perform full-fledged computing and data communication activities while they are on the move. Today's mobile computing devices commonly integrate a wide variety of functionality including a plurality of different wireless data communication capabilities, a touch-sensitive display screen, one or more microphones, and one or more video cameras. Smartphones and tablet computers are two popular examples of such mobile computing devices. The number and types of mobile computing applications that are available to mobile computing device users are also continuing to increase rapidly, as is the number of people that regularly use a mobile computing device to perform their online computing and information management tasks. In fact, mobile computing devices have become a principle computing device for many people.

Based on the compact form factor and handheld nature of many of today's mobile computing devices such as smartphones and tablet computers, these devices do not include a full-size physical keyboard or a mouse. As such, today's mobile computing device users regularly interact with their mobile computing device using its touch-sensitive display screen, microphones and video cameras. In other words, mobile computing device users regularly utilize the touch-sensitive display screen, microphones and video cameras of their mobile computing device to enter commands and data into the device.

Additionally, other types of personal computing devices such as laptop and desktop computers commonly include one or more microphones, and may be configured with a touch-sensitive display screen and one or more video cameras. Surface computers (also known as tabletop computers) also include a touch-sensitive display screen and one or more video cameras, and may be configured with one or more microphones. A user of such a personal computing device or surface computer can utilize the touch-sensitive display screen, microphones and video cameras of the device/computer to enter commands and data into the device/computer. In fact, the upcoming generation of computing device operating systems will include enhanced support for such "alternate" types of command and data entry.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Speech and gesture recognition enhancement technique embodiments described herein generally involve enhancing the recognition of user input to a computing device. In one exemplary embodiment the computing device is both voice-enabled and touch-enabled, and the user input is either speech that includes one or more words which are spoken by the user, or handwriting data that includes a series of characters which are handwritten by the user making screen-contacting gestures. After the user input is received, a user-specific supplementary data context is used to narrow the vocabulary of a user input recognition subsystem, where the user input recognition subsystem is a speech recognition subsystem whenever the user input is speech, and the user input recognition subsystem is a handwriting recognition subsystem whenever the user input is handwriting data. The user input recognition subsystem and narrowed vocabulary are then used to translate the user input into recognizable text that forms either a word or word sequence which is predicted by the user input recognition subsystem to correspond to the user input, where the narrowed vocabulary serves to maximize the accuracy of this translation.

In another exemplary embodiment the computing device is both voice-enabled and touch-enabled, and the user input is a combination of one or more prescribed words that are spoken by the user, and one or more prescribed screen-contacting gestures that are made by the user. After the user input is received, it is interpreted. The interpretation is then used to implement an appropriate command which is associated with the combination of the words and gestures, where this combination allows the user to interact with and control the computing device in a natural and efficient manner.

In yet another exemplary embodiment the computing device is both voice-enabled and vision-enabled, and the user input is a combination of one or more prescribed words that are spoken by the user, and one or more prescribed non-screen-contacting gestures that are made by the user. After the user input is received, it is interpreted. The interpretation is then used to implement an appropriate command which is associated with the combination of the words and gestures, where this combination allows the user to interact with and control the computing device in a natural and efficient manner.

DESCRIPTION OF THE DRAWINGS

The specific features, aspects, and advantages of the speech and gesture recognition enhancement technique embodiments described herein will become better understood with regard to the following description, appended claims, and accompanying drawings where:

DETAILED DESCRIPTION

Figure 1:
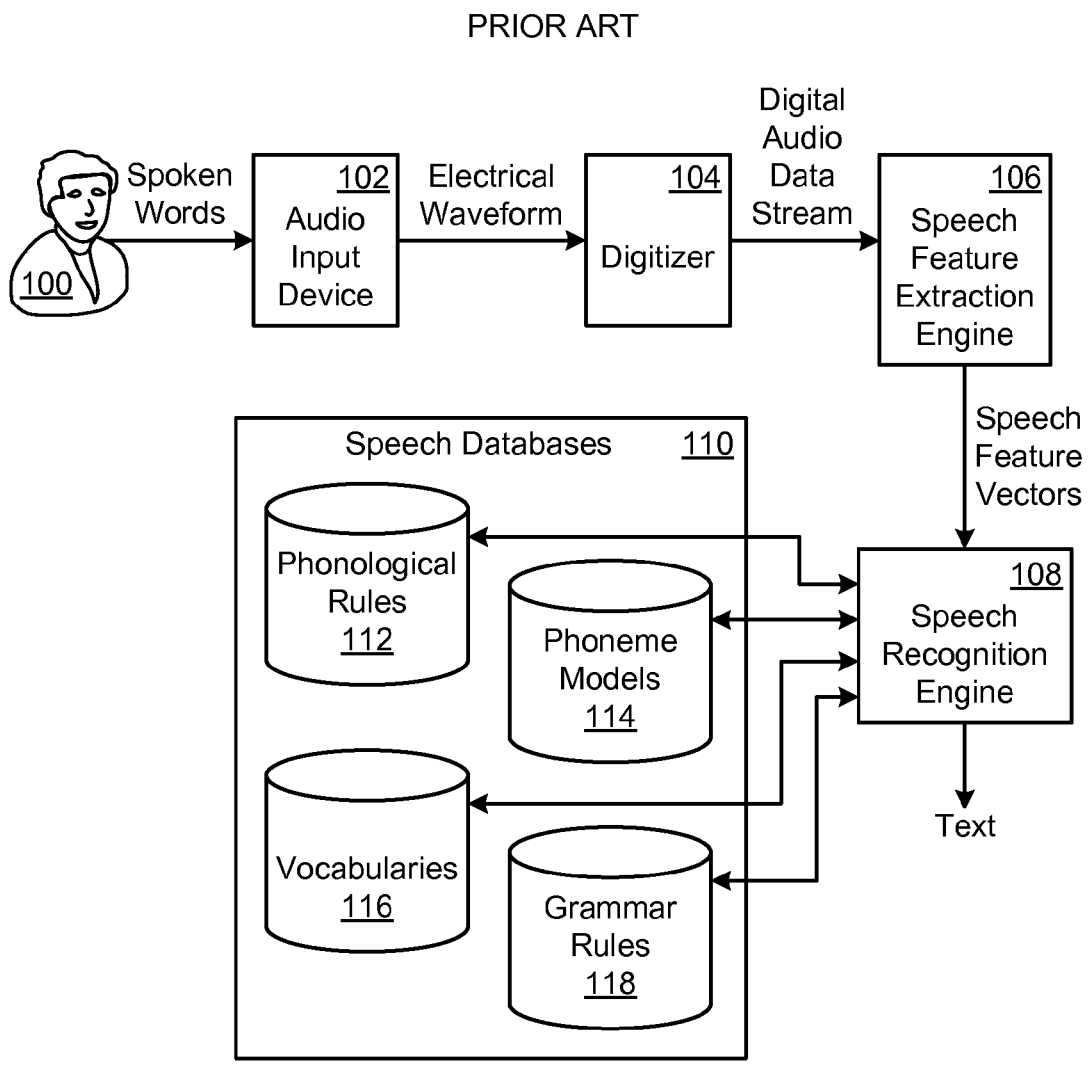
FIG. 1 is a diagram illustrating an exemplary embodiment, in simplified form, of a conventional speech recognition subsystem.

In the following description of speech and gesture recognition enhancement technique embodiments (hereafter simply referred to as "recognition enhancement technique embodiments") reference is made to the accompanying drawings which form a part hereof, and in which are shown, by way of illustration, specific embodiments in which the recognition enhancement technique can be practiced. It is understood that other embodiments can be utilized and structural changes can be made without departing from the scope of the recognition enhancement technique embodiments.

It is also noted that for the sake of clarity specific terminology will be resorted to in describing the recognition enhancement technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, structure, or characteristics described in connection with the embodiment or implementation can be included in at least one embodiment of the recognition enhancement technique. The appearances of the phrases "in one embodiment", "in another embodiment", "in an exemplary embodiment", "in an alternate embodiment", "in one implementation", "in another implementation", "in an exemplary implementation", "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the recognition enhancement technique does not inherently indicate any particular order not imply any limitations of the recognition enhancement technique.

The term "screen-contacting gesture" is used herein to refer to either a physical tap, or stroke, or compound stroke that is made directly on a touch-sensitive display screen of a computing device by a user via a given handwriting modality such as a pen or stylus which is held by the user, or a finger of the user, or the like. The term "touch-enabled computing device" is used herein to refer to a computing device that includes a touch-sensitive display screen which can detect the presence, location, and path of movement if applicable, of screen-contacting gestures that a user makes on the display screen, and then interpret the gestures. The term "voice-enabled computing device" is used herein to refer to a computing device that includes an audio input device such as one or more microphones, or the like, which can capture speech that a user utters and then interpret the speech. The audio input device can be either integrated into the computing device, or a peripheral which is externally connected to the computing device. The term "online document" is used herein to refer to a particular item of digital information content which includes text and can also include one or more other types of digital information such as images, animations, audio, video, and the like.

The term "non-screen-contacting gesture" is used herein to refer to any type of gesture that is made by a user of a computing device which does not contact a display screen of the computing device. It will be appreciated that the user can make a given non-screen-contacting gesture using various modalities. By way of example but not limitation, in one embodiment of the recognition enhancement technique described herein, the user can make a given non-screen-contacting gesture using their gaze (e.g., the user can look at a given icon which is displayed on the display screen of the computing device). In another embodiment of the recognition enhancement technique the user can make a given non-screen-contacting gesture using either one or both of their hands to form a prescribed in-air gesture which can be either substantially static or substantially moving.

The term "vision-enabled computing device" is used herein to refer to a computing device that includes a user-facing video input device which can detect the presence of non-screen-contacting gestures that a user makes, and then interpret these gestures. The video input device can be implemented in various ways including, but not limited to, the following. The video input device can be either a conventional visible light video camera which generates video data that includes a stream of color images of the user, or a conventional light-field camera (also known as a "plenoptic camera") which generates a stream of color light-field images of the user. The video input device can also be a conventional infrared structured-light projector combined with a conventional infrared video camera that is matched to the projector (also known as a "structured-light 3D scanner"), where this projector/camera combination generates video data that includes a stream of infrared images of the user. The video input device can also be either a conventional monochromatic video camera which generates video data that includes a stream of monochrome images of the user, or a conventional time-of-flight camera which generates video data that includes both a stream of depth map images of the user and a stream of color images of the user. The video input device can be either integrated into the computing device, or a peripheral which is externally connected to the computing device.

As is appreciated in the art of client computing devices, many of today's touch-enabled computing devices are also voice-enabled and vision-enabled. Similarly, many of today's voice-enabled computing devices are also touch-enabled and vision-enabled. The recognition enhancement technique embodiments described herein are operational with any type of touch-enabled and/or voice-enabled and/or vision-enabled computing device, examples of which include, but are not limited to, conventional handheld computing devices (such as smartphones, personal digital assistants (PDAs), and the like), conventional tablet computers, conventional laptop computers (also known as notebook computers), conventional desktop computers, and conventional surface computers.

1.0 Speech Recognition

This section presents a high-level overview, in simplified form, of conventional speech recognition technology. As is appreciated in the arts of computing and acoustic signal processing, speech recognition is a technology that can be implemented as a subsystem which operates under the control of a voice-enabled computing device. Generally speaking and as is appreciated in the art of speech recognition, a speech recognition subsystem translates spoken words which are uttered by a given user into user-recognizable and computer-recognizable text (hereafter simply referred to as "recognizable text") that forms a word or sequence of words which are predicted to correspond to the spoken words. This recognized text can subsequently either be displayed, or stored, or further processed, among other things, or any combination thereof. The performance of a given speech recognition subsystem is generally measured in terms of speech translation speed and speech translation accuracy. Computing technology has advanced to the point where today's conventional voice-enabled computing devices generally have sufficient computing power to implement the speech recognition subsystem and perform the speech translation fast enough to keep pace with the speech of a typical user. The speech translation accuracy of the speech recognition subsystem can be measured in various ways such as word translation error rate and command success rate, among others.

Speech recognition subsystems can be classified in various ways. By way of example but not limitation, speech recognition subsystems can be classified as being either speaker-dependent or speaker-independent. In a speaker-dependent speech recognition subsystem the subsystem is trained to a particular user, where this training can be implemented in various ways. By way of example but not limitation, in one case the subsystem can be pre-trained by the particular user speaking prescribed discrete words and/or word phrases (herein sometimes simply referred to as "phrases") and the subsystem analyzing each spoken word/phrase in order to calibrate the speech recognition to the vocal characteristics of the particular user. Such vocal characteristics may include, but are not limited to, the particular user's accent, pronunciation, articulation, pitch, volume, speaking speed, and phrasing. In another case, rather than the subsystem being pre-trained it can employ a continuous learning method to calibrate the speech recognition to the vocal characteristics of the particular user on an ongoing basis. In yet another case, the pre-training can be combined with the continuous learning method to calibrate the speech recognition to the vocal characteristics of the particular user. In a speaker-independent speech recognition subsystem the subsystem is not trained to a particular user, but rather the subsystem attempts to translate the speech of any user into recognizable text.

Speech recognition subsystems can also be classified according to the size of the vocabulary that they recognize. Small (i.e., limited) vocabulary speech recognition subsystems are commonly used in applications where a user desires to speak a prescribed small set of discrete words and/or simple and discrete word phrases in order to command and/or control their computing device. Large vocabulary speech recognition subsystems are commonly used in applications where a user desires to generate an online document by speaking a plurality of sentences which include a substantially wider variety of words. It is noted that the recognition enhancement technique embodiments described herein are compatible with any type of speech recognition subsystem.

FIG. 1 illustrates an exemplary embodiment, in simplified form, of a conventional speech recognition subsystem. As exemplified in FIG. 1, a user 100 speaks one or more words into an audio input device 102. The audio input device 102 captures the speech by transducing the variations in air pressure caused by the spoken words into a corresponding electrical waveform. The electrical waveform is processed by a digitizer 104 which uses digital sampling to convert the waveform into a digital audio data stream. The digital audio data stream is processed by a speech feature extraction engine 106 which uses a set of statistical models representing the various sounds of the language being spoken by the user 100 to extract certain significant features from the digital audio data stream. The statistical models used by the speech feature extraction engine 106 are commonly constructed using the Hidden Markov Model framework. It is noted that these statistical models can also be constructed using other modeling frameworks. The speech feature extraction engine 106 outputs a sequence of speech feature vectors which includes the features that were extracted from the digital audio data stream. The sequence of speech feature vectors is processed by a speech recognition engine 108 which uses the same statistical models as the extraction engine 106 to analyze the speech feature vectors and predict the word or sequence of words that most likely corresponds to the spoken words. The speech recognition engine 108 outputs a stream of recognizable text which corresponds to the predicted word or sequence of words.

As is appreciated in the art of speech recognition and referring again to FIG. 1, the speech recognition engine 108 may use the information included in various types of speech databases 110 to assist in the processing of the sequence of speech feature vectors, thus enhancing the accuracy of the word predictions made by the speech recognition engine. The speech databases 110 may include, but are not limited to, a phonological rules database 112, a phoneme models database 114, one or more vocabulary databases 116, and one or more grammar rules databases 118. It is noted that the vocabulary databases 116 can include both discrete words and multi-word phrases. Furthermore, these databases 112/114/116/118 can be specialized to support different languages and/or speech recognition applications, among other things). These databases 112/114/116/118 are well understood in the art of speech recognition and thus need not be further described. In the case where the speech recognition subsystem is trained as described heretofore, the training process will provide data to the phoneme models database 114.

2.0 Handwriting Recognition

This section presents a high-level overview, in simplified form, of conventional handwriting recognition technology. As is appreciated in the arts of computing and character recognition, handwriting recognition is a technology that can be implemented as a subsystem which operates under the control of a touch-enabled computing device. Generally speaking and as is appreciated in the art of handwriting recognition, a handwriting recognition subsystem translates characters which are handwritten by a given user (also referred to herein as "handwriting data") into recognizable text that forms a word or sequence of words which are predicted to correspond to the handwritten characters. This recognizable text can subsequently either be displayed, or stored, or further processed, among other things, or any combination thereof. It is appreciated that the handwritten characters can include handwritten letters (in either cursive form, or discrete form, or a combination of cursive and discrete forms), numbers, punctuation, prescribed symbols, prescribed shapes, and the like. The performance of a given handwriting recognition subsystem is generally measured in terms of handwriting translation speed and handwriting translation accuracy.

Handwriting recognition subsystems can be classified in various ways. By way of example but not limitation, handwriting recognition subsystems can be classified as being either user-dependent or user-independent. In a user-dependent handwriting recognition subsystem the subsystem is trained to a particular user, where this training can be implemented in various ways. By way of example but not limitation, in one case the subsystem can be pre-trained by the particular user handwriting prescribed characters and/or character strings and the subsystem analyzing each handwritten character or string in order to calibrate the handwriting recognition to the handwriting style of the particular user. In another case, rather than the subsystem being pre-trained it can employ a continuous learning method to calibrate the handwriting recognition to the handwriting style of the particular user on an ongoing basis. In yet another case, the pre-training can be combined with the continuous learning method to calibrate the handwriting recognition to the handwriting style of the particular user. In a user-independent handwriting recognition subsystem the subsystem is not trained to a particular user, but rather the subsystem attempts to translate the handwriting of any user into recognizable text.

Handwriting recognition subsystems can also be classified as operating in either an off-line manner or an on-line manner. In an off-line handwriting recognition subsystem the subsystem attempts to translate handwriting which has been generated by a given user sometime in the past into recognizable text. Thus, an off-line handwriting recognition subsystem attempts to translate static handwriting, commonly in the form of a paper document, into recognizable text in a batch mode. In an on-line handwriting recognition subsystem the subsystem attempts to dynamically translate the handwriting of a given user into recognizable text as each handwritten character is generated by the user. Computing technology has advanced to the point where today's conventional touch-enabled computing devices generally have sufficient computing power to implement an on-line handwriting recognition subsystem and perform the handwriting translation fast enough to keep pace with the handwriting of a typical user. It is noted that the recognition enhancement technique embodiments described herein are compatible with any type of handwriting recognition subsystem.

Figure 2:
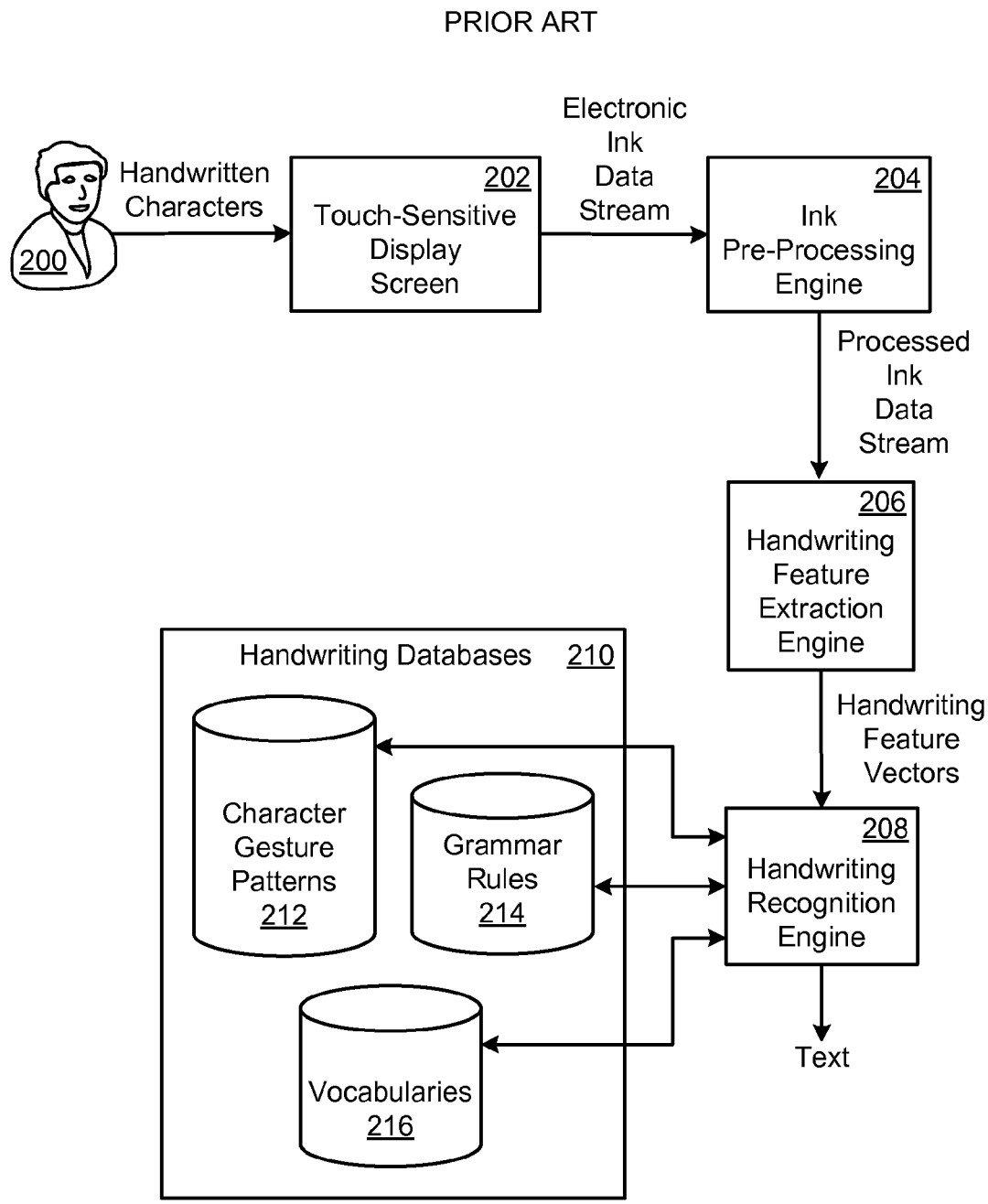
FIG. 2 is a diagram illustrating an exemplary embodiment, in simplified form, of a conventional on-line handwriting recognition subsystem.

FIG. 2 illustrates an exemplary embodiment, in simplified form, of a conventional on-line handwriting recognition subsystem. As exemplified in FIG. 2, a user 200 handwrites a series of characters on a touch-sensitive display screen 202, where the series of characters makes up one or more words. Each of the handwritten characters is composed of a combination of one or more of the aforementioned screen-contacting gestures which are physically made by the user 200 directly on the display screen 202. Each of the screen-contacting gestures can be either a tap, or a stroke having a prescribed contour, or a compound stroke which is composed of a sequence of two or more stroke segments where each stroke segment has a prescribed contour and each adjacent pair of stroke segments in the sequence interconnect at an inflection point (i.e., a point in the screen-contacting gesture which corresponds to a distinct change in direction thereof), among other things. The display screen 202 digitizes the handwritten characters and outputs an electronic ink data stream that includes a series of x and y coordinate sets which represent the screen-contacting gestures. The electronic ink data stream is processed by an ink pre-processing engine 204 which can perform one or more types of pre-processing on the x and y coordinate sets that make up the electronic ink data stream. Exemplary types of pre-processing include scaling and smoothing, among others.

The ink pre-processing engine 204 outputs a processed ink data stream which is processed by a handwriting feature extraction engine 206. The handwriting feature extraction engine 206 uses a set of statistical models representing the patterns of the various characters in the language being written by the user 200 to extract certain significant features from the processed ink data stream. The statistical models used by the handwriting feature extraction engine 206 are commonly constructed using the Hidden Markov Model framework. It is noted that these statistical models can also be constructed using other modeling frameworks The handwriting feature extraction engine 206 outputs a sequence of handwriting feature vectors which includes the features that were extracted from the processed ink data stream. The sequence of handwriting feature vectors is processed by a handwriting recognition engine 208 which uses the same statistical models as the extraction engine 206 to analyze the handwriting feature vectors and predict the word or sequence of words that most likely corresponds to the handwritten characters. The handwriting recognition engine 208 outputs a stream of recognizable text which corresponds to the predicted word or sequence of words.

As is appreciated in the art of handwriting recognition and referring again to FIG. 2, the handwriting recognition engine 208 may use the information included in various types of handwriting databases 210 to assist in the processing of the sequence of handwriting feature vectors, thus enhancing the accuracy of the word predictions made by the handwriting recognition engine. The handwriting databases 210 may include, but are not limited to, a character gesture patterns database 212, one or more vocabulary databases 216, and one or more grammar rules databases 214. It is noted that the character gesture patterns database 212 can include the handwriting gesture patterns associated with various types of characters such as letters (in either cursive form, or discrete form, or both), numbers, punctuation, prescribed symbols, prescribed shapes, and the like. The vocabulary databases 216 can include both discrete words and multi-word phrases. Furthermore, these databases 212/214/216 can be specialized to support different languages and/or handwriting recognition applications, among other things. These databases 212/214/216 are well understood in the art of handwriting recognition and thus need not be further described. In the case where the handwriting recognition subsystem is trained as described heretofore, the training process will provide data to the character gesture patterns database 212.

3.0 Speech and Screen-Contacting Gesture Recognition Enhancement

Generally speaking and as will be described in more detail in the sections that follow, the recognition enhancement technique embodiments described herein involve various methods for enhancing the recognition of speech that is input by a user into a voice-enabled computing device. The recognition enhancement technique embodiments also involve various methods for enhancing the recognition of screen-contacting gestures that are input by a user into a touch-enabled computing device. The recognition enhancement technique embodiments also involve various methods for enhancing the recognition of non-screen-contacting gestures that are input by a user into a vision-enabled computing device. The recognition enhancement technique embodiments described herein are advantageous for various reasons including, but not limited to, the following. Generally speaking and as will be appreciated from the more detailed description that follows, the recognition enhancement technique embodiments optimize the performance and speech translation accuracy of any speech recognition subsystem running on any voice-enabled computing device. The recognition enhancement technique embodiments also optimize the performance and handwriting translation accuracy of any handwriting recognition subsystem running on any touch-enabled computing device.

The recognition enhancement technique embodiments are especially effective in noisy environments where a plurality of different sounds is occurring at the same time (such as a user's voice, ambient background noise, the voices of other people, and the like). The recognition enhancement technique embodiments are particularly well suited to compact form factor, touch-enabled and/or voice-enabled computing devices which do not have a full-sized keyboard and may not even have any physical keyboard at all. Examples of such devices include the aforementioned handheld computing devices and tablet computers, among others. A user of one of these devices regularly employs either screen-contacting gestures, or their voice, or a combination thereof to enter commands and data into the device. It will be appreciated that when the user employs screen-contacting gestures to enter handwritten characters into the device, the geometric orientation of the handwritten characters may be skewed due to the fact that the user may be holding the device with one hand while they are writing the characters with their other hand. The user may also be physically moving (i.e., either walking, or sitting in a moving vehicle, or the like) and hence the device may be physically moving slightly while the user is writing the characters, which can cause additional skew in the geometric orientation of the handwritten characters, and can also cause the handwriting modality to temporarily loose contact with the device's touch-sensitive screen.

3.1 Using Context for Recognition Enhancement

This section describes an exemplary embodiment of the recognition enhancement technique described herein which generally uses a user-specific supplementary data context to enhance the recognition of both speech and handwriting data which are input by a user into a voice-enabled and touch-enabled computing device.

Figure 3:
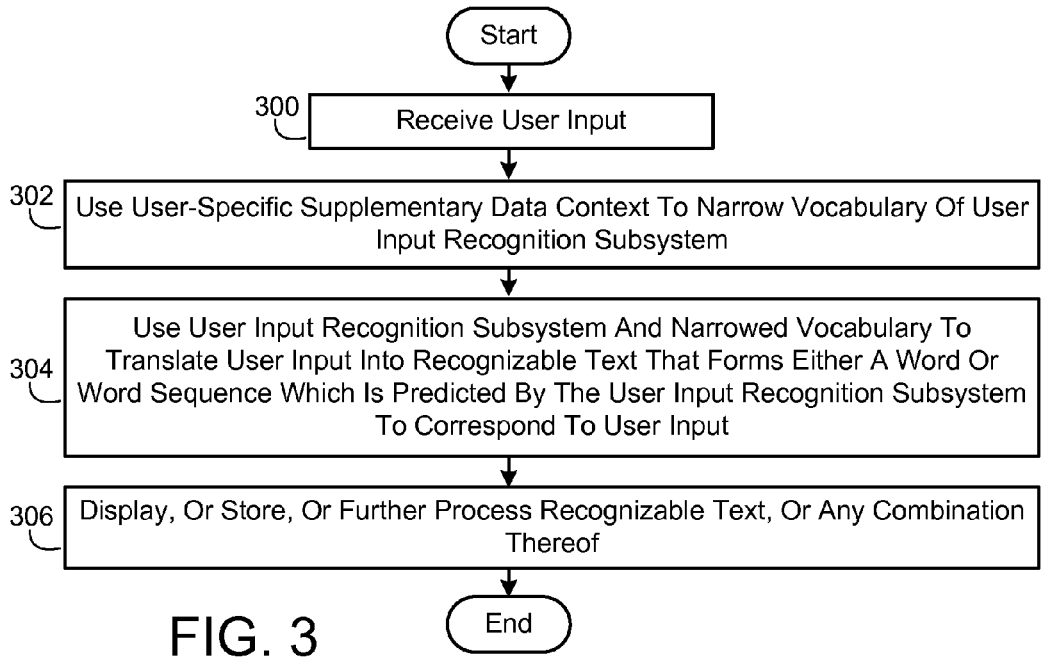
FIG. 3 is a flow diagram illustrating an exemplary embodiment, in simplified form, of a process for enhancing the recognition of user input to a computing device, where the user input is either speech or handwriting data.

FIG. 3 illustrates an exemplary embodiment, in simplified form, of a process for enhancing the recognition of user input to a voice-enabled and touch-enabled computing device, where the user input is either speech that is made up of one or more words which are spoken by the user, or handwriting data that is made up of a series of characters which are handwritten by the user making screen-contacting gestures. As exemplified in FIG. 3, the process starts in block 300 with receiving the user input. A user-specific supplementary data context is then used to narrow the vocabulary (i.e., limit the solution space) of a user input recognition subsystem (block 302), where the user input recognition subsystem is a speech recognition subsystem whenever the user input is speech, and the user input recognition subsystem is a handwriting recognition subsystem whenever the user input is handwriting data. Exemplary types of user-specific supplementary data contexts which can be used are described in more detail hereafter. The user input recognition subsystem and narrowed vocabulary are then used to translate the user input into recognizable text that forms either a word or word sequence which is predicted by the user input recognition subsystem to correspond to the user input (block 304). As will be appreciated from the more detailed description that follows, narrowing the vocabulary of the user input recognition subsystem can substantially reduce its size, which serves to maximize the accuracy of this user input translation. The recognizable text can then be either displayed, or stored, or further processed, among other things, or any combination thereof (block 306).

Figure 4:
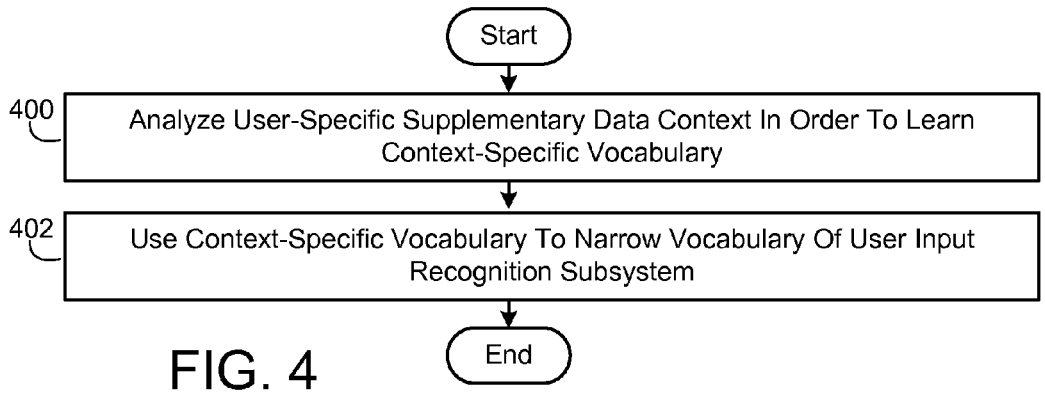
FIG. 4 is a flow diagram illustrating one embodiment, in simplified form, of a process for using a user-specific supplementary data context to narrow a vocabulary of a user input recognition subsystem.

FIG. 4 illustrates one embodiment, in simplified form, of a process for using a user-specific supplementary data context to narrow the vocabulary of the user input recognition subsystem. As exemplified in FIG. 4, the process starts in block 400 with analyzing the supplementary data context in order to learn a context-specific vocabulary. The context-specific vocabulary is then used to narrow the vocabulary of the user input recognition subsystem (block 402).

Figure 5:
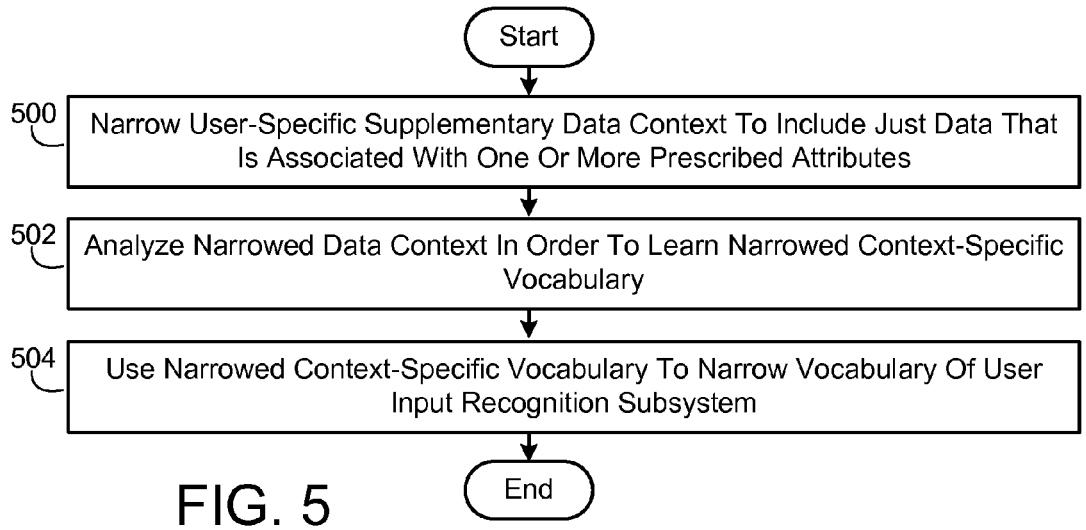
FIG. 5 is a flow diagram illustrating another embodiment, in simplified form, of a process for using a user-specific supplementary data context to narrow the vocabulary of the user input recognition subsystem.

FIG. 5 illustrates another embodiment, in simplified form, of a process for using a user-specific supplementary data context to narrow the vocabulary of the user input recognition subsystem. As exemplified in FIG. 5, the process starts in block 500 with narrowing the supplementary data context to include just data that is associated with one or more prescribed attributes. In other words, the supplementary data context can optionally be narrowed by considering the different possible natures thereof and selecting just data that is associated with one or more prescribed natures. By way of example but not limitation, the supplementary data context might be narrowed to include just data that is associated with the user's current career (data that is associated with the user's past career(s) could be ignored). The supplementary data context might also be narrowed to include just data that is work-related (personal-related data could be ignored). Once the supplementary data context has been narrowed, the narrowed data context is then analyzed in order to learn a narrowed context-specific vocabulary (block 502). The narrowed context-specific vocabulary is then used to narrow the vocabulary of the user input recognition subsystem (block 504).

Various types of user-specific supplementary data contexts can be used in the recognition enhancement technique embodiment exemplified in FIG. 3. These supplementary data contexts can be categorized in various ways. By way of example but not limitation, and as will be appreciated from the more detailed description that follows, these supplementary data contexts can be grouped into the following three categories: computing activities that the user has previously completed, computing activities that the user is currently working on, and computing activities that the user will be working on in the future. Exemplary types of user-specific supplementary data contexts will now be described.

In one implementation of the recognition enhancement technique embodiment exemplified in FIG. 3 the user-specific supplementary data context is the content of an online document that the user is currently working on, and the context-specific vocabulary is a current document vocabulary. In other words, the content of the online document that the user is currently working on is analyzed in order to learn the current document vocabulary (i.e., learn the vocabulary that is used in this document).

In another implementation of the recognition enhancement technique embodiment exemplified in FIG. 3 the user-specific supplementary data context is the content of search results for an online search that the user performed, and the context-specific vocabulary is a search results vocabulary. In other words, the content of search results for an online search that the user performed is analyzed in order to learn the search results vocabulary (i.e., learn the vocabulary that is used in the search results).

In yet another implementation of the recognition enhancement technique embodiment exemplified in FIG. 3 the user-specific supplementary data context is tasks that are currently assigned to the user, and the context-specific vocabulary is a current tasks vocabulary. In other words, tasks that are currently assigned to the user are analyzed in order to learn the current tasks vocabulary (i.e., learn the vocabulary that is used to specify these tasks). It will be appreciated that these tasks can be specified in various types of data (such as a to-do list for the user, or a project management database, among others) which are stored either on the user's computing device or another computing device which is accessible via a communications network.

In yet another implementation of the recognition enhancement technique embodiment exemplified in FIG. 3 the user-specific supplementary data context is calendar data for the user which is associated with an activity in which the user is currently involved (such as a meeting or class that the user is currently attending, among other things), and the context-specific vocabulary is a current activity vocabulary. In other words, calendar data for the user which is associated with an activity in which the user is currently involved is analyzed in order to learn the current activity vocabulary (i.e., learn the vocabulary that is used to specify this activity). It will be appreciated that this calendar data can be stored either on the user's computing device or another computing device which is accessible via a communications network.

In yet another implementation of the recognition enhancement technique embodiment exemplified in FIG. 3 the user-specific supplementary data context is the content of one or more of messages that the user previously sent, or messages that the user previously received, and the context-specific vocabulary is a messages vocabulary. In other words, the content of one or more messages that the user previously sent, or messages that the user previously received, is analyzed in order to learn the messages vocabulary (i.e., learn the vocabulary that is used in these messages). It will be appreciated that these messages can be either email messages, or text messages, or the like, or any combination thereof. It will further be appreciated that these messages can be stored either on the user's computing device or another computing device which is accessible via a communications network.

In yet another implementation of the recognition enhancement technique embodiment exemplified in FIG. 3 the user-specific supplementary data context is the content of online documents that the user previously stored (either on the user's computing device or another computing device which is accessible via a communications network), and the context-specific vocabulary is a previous documents vocabulary. In other words, the content of online documents that the user previously stored is analyzed in order to learn the previous documents vocabulary (i.e., learn the vocabulary that is used in these documents. It will be appreciated that these documents can be either documents that the user generated themselves, or documents that were provided to the user by another person, or a combination thereof.

In yet another implementation of the recognition enhancement technique embodiment exemplified in FIG. 3 the user-specific supplementary data context is contacts data for the user, and the context-specific vocabulary is a contacts vocabulary. In other words, contacts data for the user is analyzed in order to learn the contacts vocabulary (i.e., learn the vocabulary that is used in this contacts data). It will be appreciated that this contacts data can be stored either on the user's computing device or another computing device which is accessible via a communications network. It will also be appreciated that the contacts data generally includes the names of people and places (i.e., proper nouns). Thus, this particular implementation of the recognition enhancement technique embodiment exemplified in FIG. 3 optimizes the user input recognition subsystem's ability to recognize proper nouns which, as is appreciated in the arts of speech and handwriting recognition, is difficult for conventional recognition subsystems.

In yet another implementation of the recognition enhancement technique embodiment exemplified in FIG. 3 the user-specific supplementary data context is the content of speech-based audio recordings that the user previously stored (either on the user's computing device or another computing device which is accessible via a communications network), and the context-specific vocabulary is a previous audio vocabulary. In other words, the content of speech-based audio recordings that the user previously stored is analyzed in order to learn the previous audio vocabulary (i.e., learn the vocabulary that is used in these audio recordings). It will be appreciated that these audio recordings can be any type of online data that includes speech-based audio data which can be analyzed (i.e., translated) using the speech recognition subsystem. Examples of such audio recordings include speeches, presentations, and dictations, among others.

In yet another implementation of the recognition enhancement technique embodiment exemplified in FIG. 3 the user-specific supplementary data context is one or more of who the user previously sent messages to or who the user previously received messages from, and the context-specific vocabulary is a recipient/sender vocabulary. In other words, one or more of who the user previously sent messages to, or who the user previously received messages from, is analyzed in order to learn the recipient/sender vocabulary (i.e., learn the names of the people and/or organizations, and the like, that the user either sent messages to, or received messages from, or a combination thereof). It will be appreciated that these sent and received messages can be any type(s) of messages which are stored either on the user's computing device or another computing device which is accessible via a communications network, including but not limited to email messages and text messages. Since the recipients and senders of these messages are named people/organizations and the like (i.e., proper nouns), this particular implementation of the recognition enhancement technique embodiment exemplified in FIG. 3 also optimizes the user input recognition subsystem's ability to recognize proper nouns.

Generally speaking and as is appreciated in the arts of speech and handwriting recognition, speech and handwriting recognition subsystems commonly employ a weighted/ranked vocabulary, where relative weights are assigned to the different words and word phrases in the recognition subsystem's vocabulary. These relative weights serve to rank the words/phrases in the recognition subsystem's vocabulary (words/phrases having higher relative weights are ranked higher). During the speech/handwriting translation process the speech/handwriting recognition engine predicts the word or word sequence that is most likely to correspond to the user input by selecting the highest ranked words/phrases in the recognition subsystem's vocabulary. Accordingly, the context-specific vocabulary can be used to narrow the vocabulary of the user input recognition subsystem as follows. For each word/phrase appearing in the context-specific vocabulary an enhancing weight can be added to the word's/phrase's relative weight in the user input recognition subsystem's vocabulary, thus increasing the ranking of the word/phrase. Similarly, the narrowed context-specific vocabulary can be used to narrow the vocabulary of the user input recognition subsystem as follows. For each word/phrase appearing in the narrowed context-specific vocabulary an enhancing weight can be added to the word's/phrase's relative weight in the user input recognition subsystem's vocabulary.

3.2 Combining Speech and Screen-Contacting Gestures for Enhanced Command Recognition As described heretofore, a user of a voice-enabled computing device can enter a desired command into the computing device by speaking a prescribed word or word phrase into the audio input device of the computing device. Similarly, a user of a touch-enabled computing device can enter a desired command into the computing device by making a prescribed screen-contacting gesture on the touch-sensitive display screen of the computing device. This section describes an exemplary embodiment of the recognition enhancement technique described herein which generally combines speech and screen-contacting gestures to enhance the recognition of commands which are input by a user into a voice-enabled and touch-enabled computing device.

Figure 6:
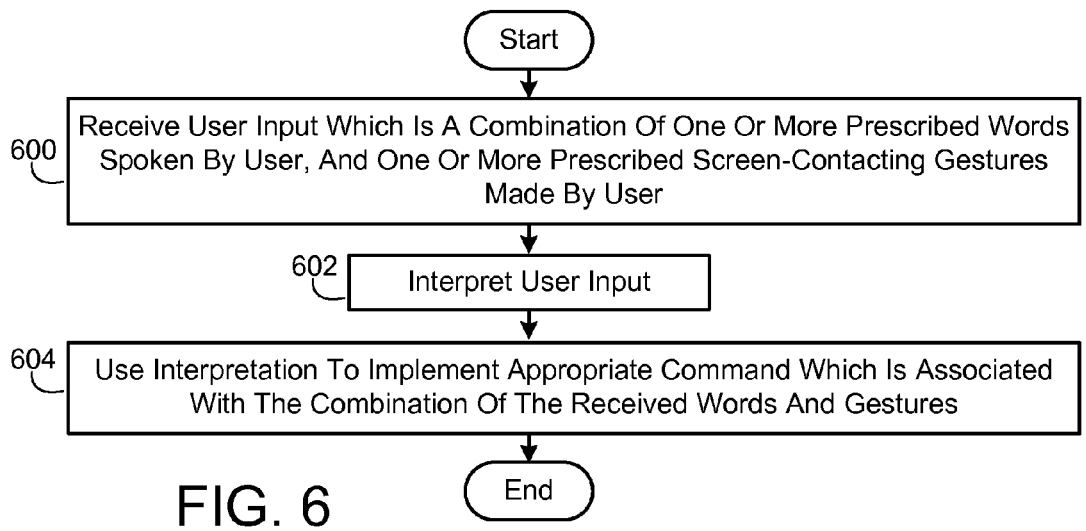
FIG. 6 is a flow diagram illustrating an exemplary embodiment, in simplified form, of a process for enhancing the recognition of commands which a user inputs to a voice-enabled and touch-enabled computing device.

FIG. 6 illustrates an exemplary embodiment, in simplified form, of a process for enhancing the recognition of commands which a user inputs to a voice-enabled and touch-enabled computing device. As exemplified in FIG. 6, the process starts in block 600 with receiving user input which is a combination of one or more prescribed words that are spoken by the user, and one or more prescribed screen-contacting gestures that are made by the user. After the user input has been received (block 600), it is interpreted (block 602), and the interpretation is used to implement an appropriate command which is associated with the combination of the received words and gestures (block 604). As will be appreciated from the more detailed description that follows, the combination of the received words and gestures allows the user to interact with and control the computing device in a natural (e.g., intuitive) and efficient (e.g., quick and easy) manner. In other words, the recognition enhancement technique embodiment exemplified in FIG. 6 provides for enhanced user command and control of the computing device.

Various combinations of speech and screen-contacting gestures can be used in the recognition enhancement technique embodiment exemplified in FIG. 6. In other words, the user input can be generated in various ways such as the following. In one situation the user can first speak the one or more prescribed words and then make the one or more prescribed screen-contacting gestures. In another situation the user can first make the one or more prescribed screen-contacting gestures and then speak the one or more prescribed words. In yet another situation, the user can speak a given one of the one or more prescribed words and make a given one of the one or more prescribed screen-contacting gestures substantially concurrently (i.e., at approximately the same time). Exemplary implementations of each of these situations will now be described.

In one implementation of the recognition enhancement technique embodiment exemplified in FIG. 6 the user can first speak a prescribed word or word phrase which is associated with a desired command (e.g., the user can be working on a document and after selecting a portion of text in the document, the user can say "italicize"). The user can then make a prescribed screen-contacting gesture which is also associated with the desired command (e.g., after saying "italicize", the user can tap on a given icon which is displayed on the touch-sensitive display screen and is associated with the italicize command). The computing device will interpret (i.e., recognize and translate) both the spoken word/phrase and the gesture, and then use both interpretations to implement the desired command (e.g., the computing device will italicize the selected text in the document). In this particular implementation the gesture serves to reinforce and confirm the recognition of the spoken word/phrase. An alternate implementation is also possible where the user can first make the prescribed screen-contacting gesture and then speak the prescribed word or word phrase, in which case the spoken word/phrase serves to reinforce and confirm the recognition of the gesture. Another alternate implementation is also possible where the user can speak the prescribed word or word phrase and make the prescribed screen-contacting gesture substantially concurrently, in which case the spoken word/phrase serves to reinforce and confirm the recognition of the gesture and vice versa.

In another implementation of the recognition enhancement technique embodiment exemplified in FIG. 6 the user can first speak a prescribed word or word phrase which is associated with a desired class of commands (e.g., the user can say "open"). The user can then make a prescribed screen-contacting gesture which serves to provide a specific context to the spoken word/phrase (e.g., after saying "open", the user can tap on a given icon which is displayed on the touch-sensitive display screen and is associated with a given file). The computing device will interpret the combination of the spoken word/phrase and the gesture, and then use the interpretation to implement an appropriate command which is associated with this combination (e.g., the computing device will open the file). An alternate implementation is also possible where the user can speak the prescribed word or word phrase and make the prescribed screen-contacting gesture substantially concurrently.

In yet another implementation of the recognition enhancement technique embodiment exemplified in FIG. 6 the user can first make a prescribed screen-contacting gesture which is associated with a desired class of commands (e.g., the user can be working on a document which is displayed on the touch-sensitive display screen and can make a stroke on the screen over a desired portion of text in the document in order to select this text). The user can then speak a prescribed word or word phrase which specifies a desired command within the class (e.g., after making the stroke, the user can say "bold"). The computing device will interpret the combination of the gesture and the spoken word/phrase, and then use the interpretation to implement an appropriate command which is associated with this combination (e.g., the computing device will make the font of the selected text bold). In this case the recognition of the spoken word/phrase is enhanced due to the fact that it can be limited to the context of the class of commands that is associated with the gesture. An alternate implementation is also possible where the user can make the prescribed screen-contacting gesture and speak the prescribed word or word phrase substantially concurrently.

In yet another implementation of the recognition enhancement technique embodiment exemplified in FIG. 6 the user can first make a first prescribed screen-contacting gesture which is associated with a desired class of commands (e.g., the user can be working on a document which is displayed on the touch-sensitive display screen and can make a stroke on the screen over a desired portion of text in the document in order to select this text). The user can then make a second prescribed screen-contacting gesture which is associated with a desired sub-class of commands (e.g., after making the stroke, the user can tap on a given field which is displayed on the screen and is associated with the font of the text). The user can then speak a prescribed word or word phrase which specifies a desired command within the sub-class (e.g., after making the stroke and tapping on the font field, the user can say "Arial"). The computing device will interpret the combination of the two gestures and the spoken word/phrase, and then use the interpretation to implement an appropriate command which is associated with this combination (e.g., the computing device will make the font type of the selected text Arial). An alternate implementation is also possible where the user can make the second prescribed screen-contacting gesture and speak the prescribed word or word phrase substantially concurrently.

In yet another implementation of the recognition enhancement technique embodiment exemplified in FIG. 6 the user can first make a prescribed screen-contacting gesture which is associated with a desired class of commands (e.g., the user can be working on a document which is displayed on the touch-sensitive display screen and can make a stroke on the screen over a desired portion of text in the document in order to select this text). The user can then speak a first prescribed word or word phrase which specifies a desired sub-class of commands (e.g., after making the stroke, the user can say "color"). The user can then speak a second prescribed word or word phrase which specifies a desired command within the sub-class (e.g., after making the stroke and saying "color", the user can say "red"). The computing device will interpret the combination of the gesture and the two spoken words/phrases, and then use the interpretation to implement an appropriate command which is associated with this combination (e.g., the computing device will make the color of the selected text red). An alternate implementation is also possible where the user can make the prescribed screen-contacting gesture and speak the first prescribed word or word phrase substantially concurrently.

3.3 Combining Speech and Non-Screen-Contacting Gestures for Enhanced Command Recognition As described heretofore, a user of a voice-enabled computing device can enter a desired command into the computing device by speaking a prescribed word or word phrase into the audio input device of the computing device. Similarly, a user of a vision-enabled computing device can enter a desired command into the computing device by making a prescribed non-screen-contacting gesture in front of the video input device of the computing device. This section describes an exemplary embodiment of the recognition enhancement technique described herein which generally combines speech and non-screen-contacting gestures to enhance the recognition of commands which are input by a user into a voice-enabled and vision-enabled computing device.

Figure 7:
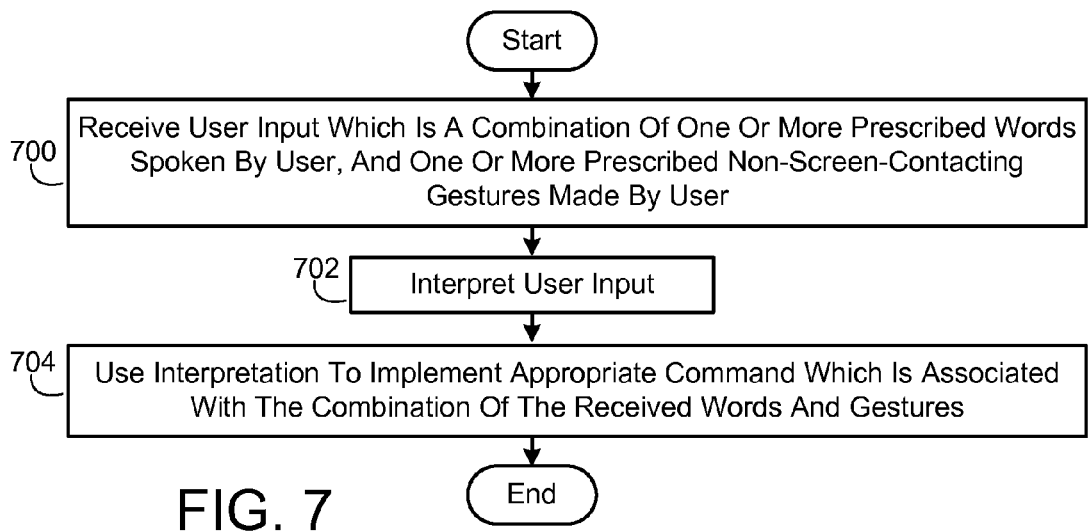
FIG. 7 is a flow diagram illustrating an exemplary embodiment, in simplified form, of a process for enhancing the recognition of commands which a user inputs to a voice-enabled and vision-enabled computing device.

FIG. 7 illustrates an exemplary embodiment, in simplified form, of a process for enhancing the recognition of commands which a user inputs to a voice-enabled and vision-enabled computing device. As exemplified in FIG. 7, the process starts in block 700 with receiving user input which is a combination of one or more prescribed words that are spoken by the user, and one or more prescribed non-screen-contacting gestures that are made by the user. As described heretofore, these one or more prescribed non-screen-contacting gestures can be either one or more gazes, or one or more in-air gestures that are formed by either one or both hands of the user. After the user input has been received (block 700), it is interpreted (block 702), and the interpretation is used to implement an appropriate command which is associated with the combination of the received words and gestures (block 704). As will be appreciated from the more detailed description that follows, the combination of the received words and gestures allows the user to interact with and control the computing device in a natural and efficient manner. In other words, the recognition enhancement technique embodiment exemplified in FIG. 7 provides for enhanced user command and control of the computing device.

It will be appreciated that the computing device can interpret the non-screen-contacting gestures that are made by the user in various ways depending on the particular modality that is being used by the user to make the gestures. By way of example but not limitation, in a situation where the user is using their gaze to make a given gesture, the video data that is generated by the video input device of the computing device can be processed using a conventional eye tracking image processing method in order to determine the user's current point of gaze (e.g., determine either the particular portion of the computing device's display screen that the user is currently looking at, or the particular item(s) of information displayed on the display screen that the user is currently looking at, among other things). In another situation where the user is using their hand(s) to form a given in-air gesture, the video data that is generated by the video input device can be processed using a conventional pattern recognition image processing method in order to identify the gesture, and in the case where the gesture is pointing at the display screen, also determine either the particular portion of the display screen that the gesture is currently pointing at, or the particular item(s) of information displayed on the display screen that the gesture is currently pointing at.

Various combinations of speech and non-screen-contacting gestures can be used in the recognition enhancement technique embodiment exemplified in FIG. 7. In other words, the user input can be generated in various ways such as the following. In one situation the user can first speak the one or more prescribed words and then make the one or more prescribed non-screen-contacting gestures. In another situation the user can first make the one or more prescribed non-screen-contacting gestures and then speak the one or more prescribed words. In yet another situation, the user can speak a given one of the one or more prescribed words and make a given one of the one or more prescribed non-screen-contacting gestures substantially concurrently. Exemplary implementations of each of these situations will now be described.

Figure 8:
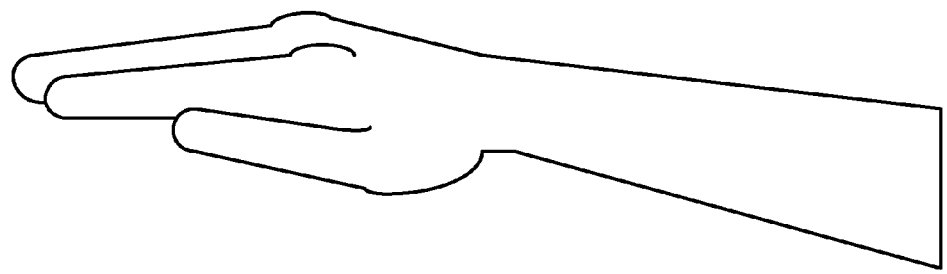
FIG. 8 is a diagram illustrating an exemplary embodiment, in simplified form, of an underline in-air gesture that is formed by the user.

In one implementation of the recognition enhancement technique embodiment exemplified in FIG. 7 the user can first speak a prescribed word or word phrase which is associated with a desired command (e.g., the user can be working on a document and after selecting a portion of text in the document, the user can say "underline"). The user can then make a prescribed non-screen-contacting gesture which is also associated with the desired command (e.g., after saying "underline", the user can either gaze at, or use their hand to form an in-air gesture that points at, a given icon which is displayed on the display screen and is associated with the underline command, or alternately the user can use their hand to form an underline in-air gesture such as that which is exemplified in FIG. 8). The computing device will interpret (i.e., recognize and translate) both the spoken word/phrase and the gesture, and then use both interpretations to implement the desired command (e.g., the computing device will underline the selected text in the document). In this particular implementation the gesture serves to reinforce and confirm the recognition of the spoken word/phrase. An alternate implementation is also possible where the user can first make the prescribed non-screen-contacting gesture and then speak the prescribed word or word phrase, in which case the spoken word/phrase serves to reinforce and confirm the recognition of the gesture. Another alternate implementation is also possible where the user can speak the prescribed word or word phrase and make the prescribed non-screen-contacting gesture substantially concurrently, in which case the spoken word/phrase serves to reinforce and confirm the recognition of the gesture and vice versa.

In another implementation of the recognition enhancement technique embodiment exemplified in FIG. 7 the user can first speak a prescribed word or word phrase which is associated with a desired class of commands (e.g., the user can say "open"). The user can then make a prescribed non-screen-contacting gesture which serves to provide a specific context to the spoken word/phrase (e.g., after saying "open", the user can either gaze at, or use their hand to form an in-air gesture that points at, a given icon which is displayed on the display screen and is associated with a given file). The computing device will interpret the combination of the spoken word/phrase and the gesture, and then use the interpretation to implement an appropriate command which is associated with this combination (e.g., the computing device will open the file). An alternate implementation is also possible where the user can speak the prescribed word or word phrase and make the prescribed non-screen-contacting gesture substantially concurrently.

In yet another implementation of the recognition enhancement technique embodiment exemplified in FIG. 7 the user can first make a prescribed non-screen-contacting gesture which is associated with a desired class of commands (e.g., the user can be working on a document which is displayed on the display screen and can either gaze at, or use their hand to form an in-air gesture that points at, a desired portion of text in the document in order to select this text). The user can then speak a prescribed word or word phrase which specifies a desired command within the class (e.g., after making the gesture, the user can say "italicize"). The computing device will interpret the combination of the gesture and the spoken word/phrase, and then use the interpretation to implement an appropriate command which is associated with this combination (e.g., the computing device will italicize the selected text). In this particular implementation the recognition of the spoken word/phrase is enhanced due to the fact that it can be limited to the context of the class of commands that is associated with the gesture. An alternate implementation is also possible where the user can make the prescribed non-screen-contacting gesture and speak the prescribed word or word phrase substantially concurrently.

In yet another implementation of the recognition enhancement technique embodiment exemplified in FIG. 7 the user can first make a first prescribed non-screen-contacting gesture which is associated with a desired class of commands (e.g., the user can be working on a document which is displayed on the display screen and can either gaze at, or use their hand to form an in-air gesture that points at, a desired portion of text in the document in order to select this text). The user can then make a second prescribed non-screen-contacting gesture which is associated with a desired sub-class of commands (e.g., after making the first gesture, the user can either gaze at, or use their hand to form an in-air gesture that points at, a given field which is displayed on the screen and is associated with the font of the text). The user can then speak a prescribed word or word phrase which specifies a desired command within the sub-class (e.g., after making the first and second gestures, the user can say "Calibri"). The computing device will interpret the combination of the two gestures and the spoken word/phrase, and then use the interpretation to implement an appropriate command which is associated with this combination (e.g., the computing device will make the font type of the selected text Calibri). An alternate implementation is also possible where the user can make the second prescribed non-screen-contacting gesture and speak the prescribed word or word phrase substantially concurrently.

In yet another implementation of the recognition enhancement technique embodiment exemplified in FIG. 7 the user can first make a prescribed non-screen-contacting gesture which is associated with a desired class of commands (e.g., the user can be working on a document which is displayed on the display screen and can either gaze at, or use their hand to form an in-air gesture that points at, a desired portion of text in the document in order to select this text). The user can then speak a first prescribed word or word phrase which specifies a desired sub-class of commands (e.g., after making the gesture, the user can say "highlight"). The user can then speak a second prescribed word or word phrase which specifies a desired command within the sub-class (e.g., after making the gesture and saying "highlight", the user can say "yellow"). The computing device will interpret the combination of the gesture and the two spoken words/phrases, and then use the interpretation to implement an appropriate command which is associated with this combination (e.g., the computing device will highlight the selected text in yellow). An alternate implementation is also possible where the user can make the prescribed non-screen-contacting gesture and speak the first prescribed word or word phrase substantially concurrently.

4.0 Additional Embodiments

While the recognition enhancement technique has been described by specific reference to embodiments thereof, it is understood that variations and modifications thereof can be made without departing from the true spirit and scope of the recognition enhancement technique. By way of example but not limitation, an alternate embodiment of the touch-enabled computing device is possible where a conventional digitizing tablet (also known as a graphics tablet or a drawing tablet, among other things) is connected to the computing device. In such an alternate embodiment the various screen-contacting gestures described herein can also be made by the user on the digitizing tablet. Similar to the touch-sensitive display screen, the digitizing tablet will digitize any screen-contacting gestures which are made thereon and output an electronic ink data stream that includes a series of x and y coordinate sets which represent the gestures.

It is also noted that any or all of the aforementioned embodiments can be used in any combination desired to form additional hybrid embodiments. Although the recognition enhancement technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

5.0 Computing Environment

Figure 9:
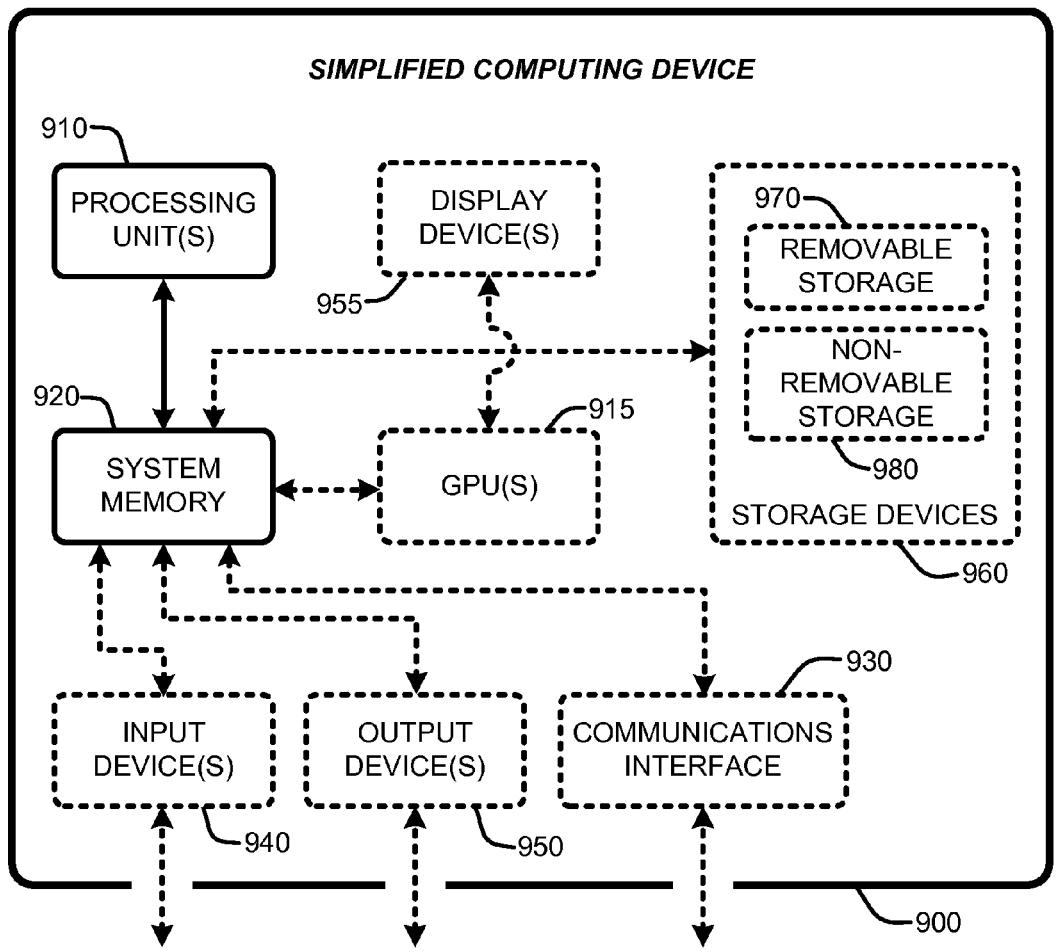
FIG. 9 is a diagram illustrating a simplified example of a general-purpose computer system on which various embodiments and elements of the speech and gesture recognition enhancement technique, as described herein, may be implemented.

The recognition enhancement technique embodiments described herein are operational within numerous types of general purpose or special purpose computing system environments or configurations. FIG. 9 illustrates a simplified example of a general-purpose computer system on which various embodiments and elements of the recognition enhancement technique, as described herein, may be implemented. It is noted that any boxes that are represented by broken or dashed lines in FIG. 9 represent alternate embodiments of the simplified computing device, and that any or all of these alternate embodiments, as described below, may be used in combination with other alternate embodiments that are described throughout this document.

For example, FIG. 9 shows a general system diagram showing a simplified computing device 900. Such computing devices can be typically be found in devices having at least some minimum computational capability, including, but not limited to, personal computers (PCs—herein also referred to as "desktop computers"), server computers, handheld computing devices (such as smartphones, personal digital assistants (PDAs), and the like), laptop computers, tablet computers, other types of mobile computers, surface computers, communications devices such as cell phones, multiprocessor systems, microprocessor-based systems, set top boxes, programmable consumer electronics, network PCs, minicomputers, mainframe computers, and audio or video media players.

To allow a device to implement the recognition enhancement technique embodiments described herein, the device should have a sufficient computational capability and system memory to enable basic computational operations. In particular, as illustrated by FIG. 9, the computational capability is generally illustrated by one or more processing unit(s) 910, and may also include one or more graphics processing units (GPUs) 915, either or both in communication with system memory 920. Note that that the processing unit(s) 910 may be specialized microprocessors (such as a digital signal processor (DSP), a very long instruction word (VLIW) processor, or other micro-controller) or can be conventional central processing units (CPUs) having one or more processing cores including, but not limited to, specialized GPU-based cores in a multi-core CPU.

In addition, the simplified computing device 900 of FIG. 9 may also include other components, such as, for example, a communications interface 930. The simplified computing device 900 of FIG. 9 may also include one or more conventional computer input devices 940 (e.g., pointing devices, keyboards, digitizing tablets, audio input devices, video input devices, other types of haptic input devices, devices for receiving wired or wireless data transmissions, and the like). The simplified computing device 900 of FIG. 9 may also include other optional components, such as, for example, one or more conventional computer output devices 950 (e.g., display device(s) 955 which may be touch-sensitive and thus may also serve as input devices, audio output devices, video output devices, devices for transmitting wired or wireless data transmissions, and the like). Note that typical communications interfaces 930, input devices 940, output devices 950, and storage devices 960 for general-purpose computers are well known to those skilled in the art, and will not be described in detail herein.

The simplified computing device 900 of FIG. 9 may also include a variety of computer readable media. Computer readable media can be any available media that can be accessed by the computer 900 via storage devices 960, and includes both volatile and nonvolatile media that is either removable 970 and/or non-removable 980, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the recognition enhancement technique described herein, or portions thereof, may be stored, received, transmitted, or read from any desired combination of computer or machine readable media or storage devices and communication media in the form of computer executable instructions or other data structures.

Finally, the recognition enhancement technique embodiments described herein may be further described in the general context of computer-executable instructions, such as program modules, being executed by a computing device. Generally, program modules include routines, programs, objects, components, data structures, and the like, that perform particular tasks or implement particular abstract data types. The recognition enhancement technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for enhancing the recognition of user input to a voice-enabled and touch-enabled computing device, comprising:

the computing device receiving the user input which is either speech comprising one or more words which are spoken by the user, or handwriting data comprising a series of characters which are handwritten by the user making screen-contacting gestures;

the computing device using a user-specific supplementary data context to narrow a vocabulary of a user input recognition subsystem and reduce the size of the vocabulary, wherein the user input recognition subsystem is a speech recognition subsystem whenever the user input is speech, and the user input recognition subsystem is a handwriting recognition subsystem whenever the user input is handwriting data; and the computing device using the user input recognition subsystem and said narrowed vocabulary to translate the user input into recognizable text that forms either a word or word sequence which is predicted by the user input recognition subsystem to correspond to the user input, wherein said narrowed vocabulary serves to maximize the accuracy of said translation.

2. The process of claim 1, wherein the process action of using a user-specific supplementary data context to narrow a vocabulary of a user input recognition subsystem comprises the actions of:

analyzing the user-specific supplementary data context in order to learn a context-specific vocabulary; and using the context-specific vocabulary to narrow the vocabulary of the user input recognition subsystem.

3. The process of claim 2, wherein the user-specific supplementary data context comprises the content of an online document that the user is currently working on, and the context-specific vocabulary comprises a current document vocabulary.

4. The process of claim 2, wherein the user-specific supplementary data context comprises the content of search results for an online search that the user performed, and the context-specific vocabulary comprises a search results vocabulary.

5. The process of claim 2, wherein the user-specific supplementary data context comprises tasks that are currently assigned to the user, and the context-specific vocabulary comprises a current tasks vocabulary.

6. The process of claim 2, wherein either,
 the user-specific supplementary data context comprises calendar data for the user which is associated with an activity in which the user is currently involved, and the context-specific vocabulary comprises a current activity vocabulary, or
 the user-specific supplementary data context comprises contacts data for the user, and the context-specific vocabulary comprises a contacts vocabulary.

7. The process of claim 2, wherein the user-specific supplementary data context comprises the content of one or more of messages that the user previously sent, or messages that the user previously received, and the context-specific vocabulary comprises a messages vocabulary.

8. The process of claim 2, wherein the user-specific supplementary data context comprises the content of online documents that the user previously stored, and the context-specific vocabulary comprises a previous documents vocabulary.

9. The process of claim 2, wherein the user-specific supplementary data context comprises the content of speech-based audio recordings that the user previously stored, and the context-specific vocabulary comprises a previous audio vocabulary.

10. The process of claim 2, wherein the user-specific supplementary data context comprises one or more of who the user previously sent messages to, or who the user previously received messages from, and the context-specific vocabulary comprises a recipient/sender vocabulary.

11. The process of claim 1, wherein the process action of using a user-specific supplementary data context to narrow a vocabulary of a user input recognition subsystem comprises the actions of:
 narrowing the user-specific supplementary data context to comprise just data that is associated with one or more prescribed attributes;
 analyzing said narrowed data context in order to learn a narrowed context-specific vocabulary; and
 using the narrowed context-specific vocabulary to narrow the vocabulary of the user input recognition subsystem.

* * * * *